United States Patent
Mukhopadhyay et al.

(10) Patent No.: US 9,816,363 B2
(45) Date of Patent: Nov. 14, 2017

(54) POLYSACCHARIDE DELIVERY UNIT FOR WELLBORE TREATMENT AGENT AND METHOD

(71) Applicant: Superior Energy Services, L.L.C., Harvey, LA (US)

(72) Inventors: Sumitra Mukhopadhyay, The Woodlands, TX (US); Chad Williams, Kingwood, TX (US); Bernard Franklin, Cypress, TX (US); Eddie G. Bowen, Porter, TX (US)

(73) Assignee: Superior Energy Services, LLC, Harvey, LA (US)

( * ) Notice: Subject to any disclaimer, the term of this patent is extended or adjusted under 35 U.S.C. 154(b) by 855 days.

(21) Appl. No.: 13/896,521

(22) Filed: May 17, 2013

(65) Prior Publication Data

US 2014/0338902 A1    Nov. 20, 2014

(51) Int. Cl.
| | |
|---|---|
| E21B 43/25 | (2006.01) |
| C09K 8/03 | (2006.01) |
| C09K 8/536 | (2006.01) |
| C09K 8/68 | (2006.01) |
| C09K 8/70 | (2006.01) |
| C09K 8/74 | (2006.01) |
| C09K 8/90 | (2006.01) |
| C09K 8/92 | (2006.01) |

(52) U.S. Cl.
CPC .............. *E21B 43/25* (2013.01); *C09K 8/03* (2013.01); *C09K 8/536* (2013.01); *C09K 8/68* (2013.01); *C09K 8/70* (2013.01); *C09K 8/74* (2013.01); *C09K 8/90* (2013.01); *C09K 8/92* (2013.01); *C09K 2208/22* (2013.01); *C09K 2208/32* (2013.01)

(58) Field of Classification Search
CPC .. E21B 43/25; C09K 8/90; C09K 8/74; C09K 8/03; C09K 8/53; C09K 8/536
See application file for complete search history.

(56) References Cited

U.S. PATENT DOCUMENTS

| | | | |
|---|---|---|---|
| 3,934,651 A | 1/1976 | Nierode et al. | |
| 4,282,351 A * | 8/1981 | Muzzarelli | A61K 9/4816 536/20 |
| 4,368,322 A * | 1/1983 | Muzzarelli | A61K 9/4816 536/17.2 |
| 4,822,500 A | 4/1989 | Dobson, Jr. et al. | |
| 4,919,209 A | 4/1990 | King | |
| 5,144,016 A | 9/1992 | Skjak-Braek et al. | |
| 5,164,099 A * | 11/1992 | Gupta | C09K 8/62 166/300 |
| 5,484,020 A | 1/1996 | Cowan | |
| 5,514,644 A | 5/1996 | Dobson | |
| 5,607,905 A | 3/1997 | Dobson, Jr. et al. | |
| 5,684,075 A | 11/1997 | Patel et al. | |
| 5,693,698 A | 12/1997 | Patel et al. | |
| 5,783,527 A | 7/1998 | Dobson, Jr. et al. | |
| 6,162,766 A | 12/2000 | Muir | |
| 6,279,656 B1 * | 8/2001 | Sinclair | C09K 8/516 166/304 |
| 6,357,527 B1 | 3/2002 | Norman | |
| 6,764,981 B1 | 7/2004 | Eoff et al. | |
| 6,981,552 B2 | 1/2006 | Reddy et al. | |
| 7,007,752 B2 | 3/2006 | Reddy et al. | |
| 7,398,825 B2 * | 7/2008 | Nguyen | C09K 8/508 166/280.1 |
| 7,475,728 B2 | 1/2009 | Pauls et al. | |
| 7,528,095 B2 | 5/2009 | Maresh | |
| 7,541,316 B2 | 6/2009 | Maresh | |
| 7,674,753 B2 | 3/2010 | Munoz, Jr. et al. | |
| 7,686,081 B1 | 3/2010 | Becker | |
| 7,829,507 B2 | 11/2010 | Todd et al. | |
| 8,336,624 B2 | 12/2012 | Becker | |
| 8,828,914 B2 * | 9/2014 | Kesavan | C08B 37/0096 507/128 |
| 8,969,261 B2 * | 3/2015 | Talingting Pabalan | A61K 8/042 424/70.13 |
| 9,029,299 B2 * | 5/2015 | Crews | C09K 8/516 507/240 |
| 9,051,406 B2 * | 6/2015 | Rodrigues | B01J 20/264 |
| 9,062,238 B2 * | 6/2015 | Kesavan | C09K 8/08 |
| 9,109,068 B2 * | 8/2015 | Rodrigues | C02F 5/10 |
| 9,371,479 B2 * | 6/2016 | Mirakyan | C09K 8/605 |
| 2004/0182575 A1 | 9/2004 | Reddy et al. | |
| 2004/0182576 A1 | 9/2004 | Reddy et al. | |
| 2005/0059557 A1 | 3/2005 | Todd et al. | |
| 2005/0261139 A1 | 11/2005 | Reddy et al. | |
| 2006/0016596 A1 | 1/2006 | Pauls et al. | |

(Continued)

FOREIGN PATENT DOCUMENTS

| | | | | |
|---|---|---|---|---|
| GB | WO 0212674 A1 * | 2/2002 | ............ | C09K 8/536 |
| GB | 2464815 A | 5/2010 | | |

(Continued)

OTHER PUBLICATIONS

PCT International Searching Authority/US, International Search Report and Written Opinion of the International Searching Authority, dated Sep. 15, 2014, for PCT/US2014/036940, "Polysaccharide Delivery Unit for Wellbore Treatment Agent and Method."

*Primary Examiner* — Zakiya W Bates
*Assistant Examiner* — Crystal J Miller
(74) *Attorney, Agent, or Firm* — Jones Walker LLP

(57) ABSTRACT

A method of treating a subterranean formation. The method may include providing a well treatment including a treatment complex formed of a treatment agent encapsulated, entrapped, or embedded in a polysaccharide, introducing the treatment complex into a wellbore through a subterranean formation, and allowing the treatment complex to release the treatment agent over a release time period. The method may include allowing the treatment complex to release the treatment agent after a delay time period from the introduction of the treatment complex into the wellbore.

34 Claims, No Drawings

(56) References Cited

U.S. PATENT DOCUMENTS

| | | | |
|---|---|---|---|
| 2006/0112862 A1 | 6/2006 | Nguyen | |
| 2006/0178273 A1 | 8/2006 | Maresh | |
| 2006/0178274 A1 | 8/2006 | Maresh | |
| 2007/0078064 A1 | 4/2007 | Munoz, Jr. et al. | |
| 2007/0135312 A1 | 6/2007 | Melbouci | |
| 2008/0058229 A1* | 3/2008 | Berkland | C09K 8/516 507/211 |
| 2008/0099203 A1 | 5/2008 | Mueller | |
| 2009/0025934 A1 | 1/2009 | Hartman et al. | |
| 2009/0105371 A1* | 4/2009 | Luster-Teasley | B09C 1/08 523/124 |
| 2009/0149353 A1 | 6/2009 | Dajani et al. | |
| 2009/0221453 A1 | 9/2009 | Mukhopadhyay | |
| 2010/0056403 A1 | 3/2010 | Abad et al. | |
| 2010/0175875 A1* | 7/2010 | Becker | C09K 8/524 166/271 |
| 2010/0307744 A1* | 12/2010 | Cochet | C09K 8/706 166/250.12 |
| 2012/0285693 A1* | 11/2012 | Mirakyan | C09K 8/605 166/308.1 |

FOREIGN PATENT DOCUMENTS

| | | |
|---|---|---|
| GB | 2487008 A | 7/2012 |
| WO | WO 02/12674 A1 | 2/2002 |

* cited by examiner

POLYSACCHARIDE DELIVERY UNIT FOR WELLBORE TREATMENT AGENT AND METHOD

SUMMARY OF THE INVENTION

A method of treating a subterranean formation includes providing a well treatment including a treatment complex comprising a treatment agent encapsulated, entrapped, or embedded in a polysaccharide, introducing the well treatment into a wellbore through the subterranean formation, and allowing the treatment complex to gradually release the treatment agent over a release time period. The method may further include introducing a second treatment agent into the wellbore after a substantial amount of the treatment agent is released from the treatment complex, causing the second treatment agent to form a second treatment complex with the polysaccharide, and allowing the second treatment complex to release the second treatment agent over a second release time period. Alternatively, the method may further include recovering the polysaccharide from the wellbore by dissolving the polysaccharide in water or in a brine solution.

In another alternative embodiment, the method of treating a subterranean formation includes providing a well treatment including a first treatment complex comprising a first treatment agent encapsulated, entrapped, or embedded in a first polysaccharide, and a second treatment complex comprising a second treatment agent encapsulated, entrapped, or embedded in a second polysaccharide; introducing the well treatment into a wellbore through the subterranean formation; allowing the first treatment complex to gradually release the first treatment agent over a first release time period; and allowing the second treatment complex to gradually release the second treatment agent over a second release time period.

DETAILED DESCRIPTION OF THE PREFERRED EMBODIMENTS

During drilling, completion, and work-over operations of an oil and gas well, various treatment agents are introduced into the wellbore. A well treatment is disclosed herein that includes a wellbore treatment agent encapsulated, entrapped, or embedded in a polysaccharide to form a treatment complex. The well treatment may be introduced into a wellbore for sustained or delayed release of the treatment agent.

The wellbore treatment agent may be any agent used in the drilling, completion, or work over operations of an oil and gas wellbore through a subterranean formation. The treatment agent may be in the form of a liquid, a solid, an emulsion, a gel, a powder, crystals, flakes, or a combination thereof. The wellbore treatment agent may include a corrosion inhibitor, a scale inhibitor, a paraffin inhibitor, an asphaltene inhibitor, or a hydrate inhibitor. Suitable corrosion inhibitors may include, but are not limited to, quaternary amines such as pyridine and quinolone quats. An example of a suitable scale inhibitor may be triethanolamine phosphate ester or other polymeric phosphate or phosphonate. Suitable paraffin inhibitors may include, but are not limited to, paraffin crystal modifiers and dispersants. Suitable paraffin crystal modifiers include, but are not limited to, ethylene vinyl acetate polymer, fatty alcohol esters of olefin maleic anhydride copolymers, and acrylate polymers of fatty alcohol esters. Suitable dispersants include, but are not limited to, dodecyl benzene sulfonate, oxyalkylated alkylphenols, and oxyalkylated alkylphenolic resins. Suitable asphaltene inhibitors may include, but are not limited to, sorbitan monooleate or polyisobutylene succinic anhydride. Suitable hydrate inhibitors may include, but are not limited to, trihydroxyethyltriazine and polyethoxy polyamine. Other examples of wellbore treatment agents that may be encapsulated, entrapped, or embedded within the polysaccharide to form the treatment complex may include, but are not limited to, breakers, pH controlling agents, trapping agents, clay control agents, fluid-loss agents, surface modifiers, acidizing agents, fines migration agents, flow-back additives, cross-linkers, emulsifiers, initiators for polymerization, water control agents, and tracer molecules, and $H_2S$ scavengers.

The polysaccharide may be naturally occurring, linear or crosslinked, and/or heat-resistant. The polysaccharide may be completely water soluble or water soluble at a certain temperature or a certain pH. Suitable polysaccharides include, but are not limited to, starches, starch derivatives, modified starches, cellulose derivatives, naturally occurring gums, and biopolymers. Examples of suitable starch derivatives and modified starches may include, but are not limited to, pregelatinized starches, crosslinked starches, dextrinized starches, oxidized starches, degraded starches, starch ethers, and starch esters. An example of a suitable degraded starch may be, but is not limited to, maltodextrin. Examples of suitable starch ethers may include, but are not limited to, carboxymethyl starch, hydroxyethyl starch, hydroxypropyl starch, and a cationic starch. An example of a suitable starch ester may be, but is not limited to, starch acetate. Suitable cellulose derivatives may include, but are not limited to carboxymethyl cellulose, hydroxyethyl cellulose, hydroxypropyl cellulose, carboxymethyl hydroxyethyl, methyl cellulose, and a cationic cellulose. Suitable gums may include, but are not limited to, guar gum, hydroxypropyl guar, carboxymethyl hydroxypropyl guar, locust bean gum, ghatti gum, karaya gum, tamarind gum, carrageenan, and alginate. Examples of suitable biopolymers may include, but are not limited to xanthan gum, welan gum, or gellan gum. Further examples of suitable polysaccharides include, but are not limited to, agar and chitosan.

A crosslinking agent may be added to the polysaccharide to form a crosslinked polysaccharide. The crosslinking agent may include a cation or an anion. An example of a suitable cation may be, but is not limited to, $Ca^{2+}$. An example of a suitable anion may be, but is not limited to, $Cl^-$. Examples of suitable crosslinking agents may include, but are not limited to, apchlorohydrane, glutaraldehyde, and divinyl sulfone. In one embodiment, the polysaccharide and the treatment agent may both be water soluble, but the treatment complex may be made water insoluble or slowly dissolvable up to a certain temperature by the addition of a crosslinking agent in the polysaccharide. For example, the polysaccharide may be calcium alginate cross-linked polymer, which dissolves in water at a temperature of 250° F. or greater.

A well treatment may include a treatment agent encapsulated, entrapped, or embedded (such as by adsorption) in a polysaccharide to form a treatment complex. The treatment complex may be in the form of a powder, a slurry, a gel, gel strips, films, beads, agglomerates, capsules, or any other form capable of being deployed into a wellbore in a well treatment. Methods of encapsulating, entrapping, and embedding are well known in the art.

In one embodiment, the treatment complex may include beads formed by a treatment agent encapsulated in a polysaccharide coating. The beads may have polysaccharide coatings with varying thicknesses for sustained release of the treatment agent over a release time period. The thickness of the polysaccharide coatings of the beads may vary as necessary up to 80%. The beads may also have varying mesh sizes. The mesh sizes of the beads may vary from 200 μm to 800 μm.

In another embodiment, the treatment complex may be coated with a polycationic polymer to delay a beginning time of the release time period for a delay time period. Examples of suitable polycationic polymers for the additional coating on the treatment complex include, but are not limited to, chitosan, poly(dimethyl diallylammonium chloride), quaternarized derivatives of poly(dimethyl aminoethyl methylacrylate) peptide.

The well treatment may be introduced into a wellbore through a subterranean formation, and the treatment complex may be allowed to release the treatment agent over a release time period. Polysaccharides are known to degrade or melt at higher temperatures such as the temperatures within the wellbore. The treatment agent may be released from the treatment complex as the polysaccharide begins to degrade or melt at higher temperatures in the wellbore. The treatment agent may be retained in the treatment complex for a delay time period before the treatment agent is released. The treatment agent may be released over a release time period from the end of the delay time period until the polysaccharide is completely broken down or dissolved in the reservoir fluid. Alternatively, the treatment agent may be released through diffusion. The rate of diffusion of the treatment agent from the treatment complex may increase with temperature increases. In this way, the well treatment provides a mechanism for employing a treatment agent in a wellbore with the ability to manipulate the time period for release of the treatment agent. Delayed and/or sustained release of the treatment agent from the treatment complex may be achieved. The delay time period may depend on when certain reservoir fluids contact the treatment complex and on the wellbore temperature. The delay time period may range from 1 hour to 24 hours. The release time period may range from 1 day to 10 years.

The well treatment introduced into the wellbore may include the treatment complex in a brine solution. Suitable brine solutions include, but are not limited to, calcium chloride, potassium chloride, sodium chloride, calcium bromide, potassium bromide, sodium bromide, zinc chloride, zinc bromide, potassium formate, cesium formate, sodium formate, calcium formate, or any combination of these brines. Alternatively, the well treatment introduced into the wellbore may include the treatment complex in a stimulation fluid, such as fracturing, acidizing, or gravel packing fluids. Generally, the amount of treatment complex in the well treatment may be an amount of treatment complex that includes a sufficient amount of treatment agent to accomplish the goal of the treatment agent in the wellbore. This amount will be determinable by one of ordinary skill in the art with the benefit of this disclosure. In some embodiments, the amount of the treatment complex may be in the range of about 2% to about 10% by weight of a proppant with which the well treatment is introduced into the wellbore.

In another embodiment, the well treatment may be placed within a carrier, a downhole tool, a sliding sleeve, a screen, a passive or active inflow control device, or in a proppant pack, which is then employed downhole for the introduction of the treatment complex into the wellbore. In one embodiment, the well treatment may be used for proppant flow-back prevention.

After all or substantially all of the treatment agent is released from the treatment complex in the wellbore which may be at the end of the release time period, a second treatment agent may be introduced into the wellbore to form a second treatment complex with the polysaccharide in the wellbore. The second treatment agent may be introduced into the wellbore in a liquid form. The second treatment agent may be the same as or different from the treatment agent included in the treatment complex that was initially introduced into the wellbore. The second treatment complex may be formed by adsorption or diffusion of the second treatment agent onto or into the polysaccharide in the wellbore. The second treatment complex may be allowed to release the second treatment agent over a second release time period.

In one embodiment, a well treatment may include treatment complexes having differing treatment agents and/or differing polysaccharides. For example, a well treatment may include a first treatment complex formed of a first treatment agent encapsulated, entrapped, or embedded in a first polysaccharide, and a second treatment complex formed of a second treatment agent encapsulated, entrapped, or embedded in a second polysaccharide. The first treatment agent may be a different wellbore treatment agent than the second treatment agent, but the first treatment complex and the second treatment complex may be included in a single well treatment that is deployed in a wellbore. The first treatment agent and the second treatment agent may be any of the above-described treatment agents. The first polysaccharide and the second polysaccharide may be any of the above-described polysaccharides.

The encapsulating, entrapping, or embedding polysaccharides may be recovered from the wellbore after the treatment agent is released by dissolving the polysaccharide in water or a suitable brine solution, or at a suitable pH or temperature.

Example 1

A treatment complex was formed by encapsulating a solid treatment agent in a polysaccharide matrix. Specifically, the treatment agent was a solid scale inhibitor and the polysaccharide was agar. A photomicrograph taken at 20× magnification showed that the crystalline particles of the solid scale inhibitor were visible through the agar matrix layer. The solid scale inhibitor may be released from the agar matrix through diffusion. The solid scale inhibitor may also be released when the agar begins to dissolve in water at elevated temperatures (e.g., 185° F. or greater).

Example 2

A treatment complex was formed by encapsulating a liquid treatment agent in a polysaccharide matrix. Specifically, the treatment agent was a liquid scale inhibitor and the polysaccharide was agar. A photomicrograph taken at 50× magnification showed agar beads containing the liquid scale inhibitor. The liquid scale inhibitor may be released from the agar beads through diffusion. The liquid scale inhibitor may also be released when the agar begins to dissolve in water at elevated temperatures (e.g., 185° F. or greater).

Example 3

A treatment complex was formed by entrapping a treatment agent in a cross-linked polysaccharide matrix. Specifically, the treatment agent was a solid scale inhibitor and the polysaccharide was alginate. A photomicrograph taken at 50× magnification showed alginate beads containing the solid scale inhibitor. The solid scale inhibitor may be released from the alginate beads through diffusion. The solid scale inhibitor may also be released when the alginate begins to dissolve in water at elevated temperatures (e.g., 250° F. or greater).

The solid scale inhibitor may also be released in an aqueous medium containing at least one type of mono-positive ions, such as sodium ($Na^+$) or potassium ($K^+$) ions, as de-crosslinking occurs. However, when a brine with a purely divalent ion, such as $Ca^{2+}$ or $Zn^{2+}$, is present in the aqueous medium, the release of the solid scale inhibitor may be significantly slower. A first sample of the alginate beads were placed in deionized water and a second sample of the alginate beads were placed in a 1% sodium sulfate brine. After 72 hours at 150° F., the alginate beads in the brine solution (second sample) began swelling and releasing the solid scale inhibitor faster than the alginate beads in the deionized water (first sample).

The solid scale inhibitor may be released in response to a pH trigger. At an acidic pH (e.g., ≤1), the polysaccharide coating slowly breaks down to release the encapsulated treatment agent. At pH values of about 3 to about 4, the treatment agent slowly releases the treatment agent. The third set of alginate beads containing the entrapped solid scale inhibitor was placed in a solution having a pH value of 3 also for 72 hours at 150° F. The alginate beads in the acidic solution (third sample) showed more rapid break-down of the alginate coating than the alginate beads in deionized water (first sample).

Example 4

A proppant flow test was conducted using an acrylic column fitted with pressure transducers and temperature controllers at both ends. The acrylic column used had a length of two feet and a diameter of one inch. The column was packed with a mixture of 30-50 mesh EconoProp proppant and 1 to 5% by weight of a treatment complex formed of polysaccharide beads encapsulating solid or liquid scale inhibitors (i.e., the treatment agent). Deionized water at a temperature of 150° F. was flowed through the column and the effluent was collected initially and at a certain pore volume interval. The collected samples were analyzed for the presence of the scale inhibitor by determining the phosphate concentrations in the samples. Significant amount of the scale inhibitor was detected up to several thousand pore volumes. Corresponding scale tests with the effluents showed no significant scale formation when compared with a blank test where no scale inhibitor was added.

The embodiments described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

We claim:

1. A method of treating a subterranean formation, comprising the steps of:
   (a) providing a well treatment comprising a treatment complex formed of a treatment agent entrapped or embedded in a polysaccharide matrix, wherein the treatment agent comprises a corrosion inhibitor, a scale inhibitor, a paraffin inhibitor, an asphaltene inhibitor, a hydrate inhibitor, a breaker, a pH controlling agent, a trapping agent, a clay control agent, a fluid-loss agent, a surface modifier, an acidizing agent, a fines migration agent, a flow-back additive, a cross-linker, an emulsifier, an initiator for polymerization, a tracer molecule, or an $H_2S$ scavenger;
   (b) introducing the well treatment into a wellbore through a subterranean formation; and
   (c) allowing the treatment complex to release the treatment agent over a release time period by diffusion through the polysaccharide matrix, wherein the polysaccharide matrix is not dissolved during the release time period, wherein the release time period is between six months and ten years.

2. The method of claim 1, wherein the treatment complex is in the form of a powder, a slurry, a gel, gel strips, films, beads, or agglomerates.

3. The method of claim 2, wherein the treatment complex is in the form of beads, and wherein the beads have a range of mesh sizes.

4. The method of claim 3, wherein the beads have a range of thicknesses.

5. The method of claim 1, wherein the treatment complex is coated with a polycationic polymer to delay a beginning of the release time period for a delay time period.

6. The method of claim 1, wherein the well treatment introduced into the wellbore in step (b) further comprises a brine solution or a stimulation fluid.

7. The method of claim 6, wherein the well treatment introduced into the wellbore in step (b) further comprises a brine solution comprising calcium chloride, potassium chloride, sodium chloride, calcium bromide, potassium bromide, sodium bromide, zinc chloride, zinc bromide, potassium formate, cesium formate, sodium formate, or calcium formate.

8. The method of claim 6, wherein the well treatment introduced into the wellbore in step (b) further comprises a stimulation fluid comprising a fracturing fluid, an acidizing fluid, or a gravel packing fluid.

9. The method of claim 1, wherein the well treatment is placed within a carrier, a downhole tool, a sliding sleeve, a screen, a passive or active inflow control device, or in a proppant pack for its introduction into the wellbore in step (b).

10. The method of claim 1, wherein the treatment agent is in the form of a liquid, a solid, an emulsion, a gel, a powder, crystals, flakes, or a combination thereof.

11. The method of claim 1, wherein the treatment agent is selected from the group consisting of a corrosion inhibitor, a scale inhibitor, a paraffin inhibitor, an asphaltene inhibitor, and a hydrate inhibitor.

12. The method of claim 11, wherein the treatment agent comprises triethanolamine phosphate ester.

13. The method of claim 11, wherein the treatment agent comprises ethylene vinyl acetate polymer, fatty alcohol esters of olefin maleic anhydride copolymers, or an acrylate polymer of a fatty alcohol ester.

14. The method of claim 11, wherein the treatment agent comprises dodecyl benzene sulfonate, an oxyalkylated alkylphenol, or an axyalkylated alkylphenolic resin.

15. The method of claim 11, wherein the treatment agent comprises sorbitan monooleate or polyisobutylene succinic anhydride.

16. The method of claim 11, wherein the treatment agent comprises trihydroxyethyltriazine or polyethoxy polyamine.

17. The method of claim 1, wherein the treatment agent is selected from the group consisting of a breaker, a pH controlling agent, a trapping agent, a clay control agent, a fluid-loss agent, a surface modifier, an acidizing agent, a fines migration agent, a flow-back additive, a cross-linker, an emulsifier, an initiator for polymerization, a tracer molecule, and an H$_2$S scavenger.

18. The method of claim 1, wherein the polysaccharide matrix is naturally occurring.

19. The method of claim 1, wherein the polysaccharide matrix comprises agar, chitosan, carrageenan, or alginate.

20. The method of claim 1, wherein the polysaccharide matrix comprises a starch, a starch derivative, a modified starch, a cellulose derivative, a naturally occurring gum, or a biopolymer.

21. The method of claim 20, wherein the polysaccharide matrix comprises maltodextrin, carboxymethyl starch, hydroxyethyl starch, hydroxypropyl starch, a cationic starch, or starch acetate.

22. The method of claim 20, wherein the polysaccharide matrix comprises carboxymethyl cellulose, hydroxyethyl cellulose, hydroxypropyl cellulose, carboxymethyl hydroxyethyl, methyl cellulose, or a cationic cellulose.

23. The method of claim 20, wherein the polysaccharide matrix comprises guar gum, hydroxypropyl guar, carboxymethyl hydroxypropyl guar, locust bean gum, ghatti gum, karaya gum, tamarind gum, carrageenan, or alginate.

24. The method of claim 20, wherein the polysaccharide matrix comprises xanthan gum, welan gum, or gellan gum.

25. The method of claim 1, wherein the polysaccharide matrix is crosslinked with a crosslinking agent comprising Ca$^{2+}$ ions or Cl$^-$ ions.

26. The method of claim 1, further comprising the step of:
(d) introducing a second treatment agent into the wellbore through the subterranean formation after a substantial amount of the treatment agent is released from the treatment complex;
(e) causing the second treatment agent to form a second treatment complex with the polysaccharide matrix from the treatment complex in the wellbore, wherein the second treatment agent is formed by entrapping or embedding the second treatment agent in the polysaccharide matrix from the treatment complex; and
(f) allowing the second treatment complex to release the second treatment agent over a second release time period by diffusion through the polysaccharide matrix, wherein the polysaccharide matrix is not dissolved during the second release time period.

27. A method of treating a subterranean formation, comprising the steps of:
(a) providing a well treatment comprising a treatment complex formed of a treatment agent entrapped or embedded in a polysaccharide matrix, wherein the treatment agent comprises a corrosion inhibitor, a scale inhibitor, a paraffin inhibitor, an asphaltene inhibitor, a hydrate inhibitor, a breaker, a pH controlling agent, a trapping agent, a clay control agent, a fluid-loss agent, a surface modifier, an acidizing agent, a fines migration agent, a flow-back additive, a cross-linker, an emulsifier, an initiator for polymerization, a tracer molecule, or an H$_2$S scavenger;
(b) introducing the well treatment into a wellbore through a subterranean formation;
(c) allowing the treatment complex to release the treatment agent over a release time period by diffusion through the polysaccharide matrix, wherein the polysaccharide matrix is not dissolved during the release time period, wherein the release time period is between six months and ten years; and
(d) recovering the polysaccharide matrix from the wellbore by dissolving the polysaccharide matrix in water or in a brine solution.

28. The method of claim 27, wherein the treatment agent is selected from the group consisting of a corrosion inhibitor, a scale inhibitor, a paraffin inhibitor, an asphaltene inhibitor, and a hydrate inhibitor.

29. The method of claim 27, wherein the treatment agent is selected from the group consisting of a breaker, a pH controlling agent, a trapping agent, a clay control agent, a fluid-loss agent, a surface modifier, an acidizing agent, a fines migration agent, a flow-back additive, a cross-linker, an emulsifier, an initiator for polymerization, a tracer molecule, and an H$_2$S scavenger.

30. A method of treating a subterranean formation, comprising the steps of:
(a) providing a well treatment comprising:
a first treatment complex formed of a first treatment agent entrapped or embedded in a first polysaccharide matrix, wherein the first treatment agent comprises a corrosion inhibitor, a scale inhibitor, a paraffin inhibitor, an asphaltene inhibitor, a hydrate inhibitor, a breaker, a pH controlling agent, a trapping agent, a clay control agent, a fluid-loss agent, a surface modifier, an acidizing agent, a fines migration agent, a flow-back additive, a cross-linker, an emulsifier, an initiator for polymerization, a tracer molecule, or an H$_2$S scavenger, and
a second treatment complex formed of a second treatment agent entrapped or embedded in a second polysaccharide matrix, wherein the second treatment agent comprises a corrosion inhibitor, a scale inhibitor, a paraffin inhibitor, an asphaltene inhibitor, a hydrate inhibitor, a breaker, a pH controlling agent, a trapping agent, a clay control agent, a fluid-loss agent, a surface modifier, an acidizing agent, a fines migration agent, a flow-back additive, a cross-linker, an emulsifier, an initiator for polymerization, a tracer molecule, or an H$_2$S scavenger;
(b) introducing the treatment into a wellbore through a subterranean formation; and
(c) allowing the first treatment complex to release the first treatment agent over a first release time period by diffusion through the first polysaccharide matrix, wherein the first polysaccharide matrix is not dissolved during the first release time period, and allowing the second treatment complex to release the second treatment agent over a second release time period by diffusion through the second polysaccharide matrix, wherein the second polysaccharide matrix is not dissolved during the second release time period, wherein the first release time period and the second release time period are each between six months and ten years.

31. The method of claim 30, wherein the first treatment agent is selected from the group consisting of a corrosion inhibitor, a scale inhibitor, a paraffin inhibitor, an asphaltene inhibitor, and a hydrate inhibitor.

32. The method of claim 30, wherein the first treatment agent is selected from the group consisting of a breaker, a pH controlling agent, a trapping agent, a clay control agent, a fluid-loss agent, a surface modifier, an acidizing agent, a fines migration agent, a flow-back additive, a cross-linker, an emulsifier, an initiator for polymerization, a tracer molecule, and an H$_2$S scavenger.

33. The method of claim 30, wherein the second treatment agent is selected from the group consisting of a corrosion inhibitor, a scale inhibitor, a paraffin inhibitor, an asphaltene inhibitor, and a hydrate inhibitor.

34. The method of claim 30, wherein the second treatment agent is selected from the group consisting of a breaker, a pH controlling agent, a trapping agent, a clay control agent, a fluid-loss agent, a surface modifier, an acidizing agent, a fines migration agent, a flow-back additive, a cross-linker, an emulsifier, an initiator for polymerization, a tracer molecule, and an $H_2S$ scavenger.

* * * * *